(12) United States Patent
Branson et al.

(10) Patent No.: US 9,135,057 B2
(45) Date of Patent: *Sep. 15, 2015

(54) OPERATOR GRAPH CHANGES IN RESPONSE TO DYNAMIC CONNECTIONS IN STREAM COMPUTING APPLICATIONS

(71) Applicant: International Business Machines Corporation, Armonk, NY (US)

(72) Inventors: Michael J. Branson, Rochester, MN (US); Ryan K. Cradick, Oronoco, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/780,800

(22) Filed: Feb. 28, 2013

(65) Prior Publication Data

US 2013/0290969 A1   Oct. 31, 2013

Related U.S. Application Data

(63) Continuation of application No. 13/456,600, filed on Apr. 26, 2012.

(51) Int. Cl.
*G06F 9/46* (2006.01)
*G06F 9/455* (2006.01)
*G06F 9/48* (2006.01)
(Continued)

(52) U.S. Cl.
CPC ............... *G06F 9/48* (2013.01); *G06F 9/5083* (2013.01); *G06F 11/3433* (2013.01)

(58) Field of Classification Search
None
See application file for complete search history.

(56) References Cited

U.S. PATENT DOCUMENTS

| 4,612,624 A | 9/1986 | Tsuji |
|---|---|---|
| 6,243,755 B1 | 6/2001 | Takagi et al. |

(Continued)

FOREIGN PATENT DOCUMENTS

| JP | 10097437 A | 4/1998 |
|---|---|---|
| JP | 2001325041 A | 11/2001 |
| WO | 2010020577 A1 | 2/2010 |

OTHER PUBLICATIONS

U.S. Appl. No. 13/190,757 entitled Dynamic Runtime Choosing of Processing Communication Methods, filed Jul. 26, 2011.

(Continued)

*Primary Examiner* — Abdullah Al Kawsar
*Assistant Examiner* — Bradley Teets
(74) *Attorney, Agent, or Firm* — Patterson & Sheridan, LLP

(57) ABSTRACT

A stream computing application may permit one job to connect to a data stream of a different job. As more and more jobs dynamically connect to the data stream, the connections may have a negative impact on the performance of the job that generates the data stream. Accordingly, a variety of metrics and statistics (e.g., CPU utilization or tuple rate) may be monitored to determine if the dynamic connections are harming performance. If so, the stream computing system may be optimized to mitigate the effects of the dynamic connections. For example, particular operators may be unfused from a processing element and moved to a compute node that has available computing resources. Additionally, the stream computing application may clone the data stream in order to distribute the workload of transmitting the data stream to the connected jobs.

9 Claims, 6 Drawing Sheets

(51) Int. Cl.
*G06F 9/50* (2006.01)
*G06F 11/34* (2006.01)

(56) References Cited

U.S. PATENT DOCUMENTS

| | | | |
|---|---|---|---|
| 6,347,254 | B1 | 2/2002 | Lu |
| 6,516,409 | B1 | 2/2003 | Sato |
| 7,206,861 | B1 | 4/2007 | Callon |
| 7,480,640 | B1 | 1/2009 | Elad et al. |
| 7,529,752 | B2 | 5/2009 | Hinshaw et al. |
| 7,577,667 | B2 | 8/2009 | Hinshaw et al. |
| 7,644,863 | B2 | 1/2010 | Chen et al. |
| 7,834,875 | B2 | 11/2010 | Liu et al. |
| 7,860,009 | B2 | 12/2010 | Pike et al. |
| 7,944,863 | B2 | 5/2011 | Smith et al. |
| 8,055,492 | B2 | 11/2011 | Adir |
| 8,090,974 | B1 | 1/2012 | Jain et al. |
| 2002/0083063 | A1 | 6/2002 | Egolf |
| 2003/0229817 | A1 | 12/2003 | Colasurdo et al. |
| 2004/0052212 | A1 | 3/2004 | Baillargeon |
| 2006/0004935 | A1 | 1/2006 | Seto et al. |
| 2006/0026269 | A1 | 2/2006 | Sadovsky et al. |
| 2006/0036619 | A1 | 2/2006 | Fuerst et al. |
| 2006/0064438 | A1 | 3/2006 | Aggarwal |
| 2006/0206706 | A1 | 9/2006 | Dietz |
| 2006/0218123 | A1 | 9/2006 | Chowdhuri et al. |
| 2006/0224763 | A1 | 10/2006 | Altunbasak et al. |
| 2007/0073685 | A1 | 3/2007 | Thibodeau et al. |
| 2007/0091089 | A1 | 4/2007 | Jiao et al. |
| 2007/0091827 | A1 | 4/2007 | Boers et al. |
| 2007/0129045 | A1 | 6/2007 | Aerrabotu |
| 2007/0147258 | A1 | 6/2007 | Mottishaw et al. |
| 2007/0240112 | A1 | 10/2007 | Haselden et al. |
| 2007/0288635 | A1 | 12/2007 | Gu et al. |
| 2007/0299980 | A1 | 12/2007 | Amini et al. |
| 2008/0000539 | A1 | 1/2008 | Bivin |
| 2008/0005392 | A1 | 1/2008 | Amini et al. |
| 2008/0028095 | A1 | 1/2008 | Lang et al. |
| 2008/0052041 | A1 | 2/2008 | Misra et al. |
| 2008/0071939 | A1 | 3/2008 | Tanaka et al. |
| 2008/0168179 | A1 | 7/2008 | Gu et al. |
| 2008/0219281 | A1 | 9/2008 | Akin et al. |
| 2008/0238923 | A1 | 10/2008 | Liu et al. |
| 2009/0003600 | A1 | 1/2009 | Chen et al. |
| 2009/0034498 | A1 | 2/2009 | Banerjea et al. |
| 2009/0037553 | A1 | 2/2009 | Yuan et al. |
| 2009/0178043 | A1 | 7/2009 | Prasanna et al. |
| 2009/0216624 | A1 | 8/2009 | Kato |
| 2009/0216694 | A1 | 8/2009 | Lang et al. |
| 2009/0254774 | A1 | 10/2009 | Chamdani et al. |
| 2009/0313400 | A1 | 12/2009 | Amini et al. |
| 2009/0313614 | A1 | 12/2009 | Andrade et al. |
| 2010/0030896 | A1 | 2/2010 | Chandramouli et al. |
| 2010/0106946 | A1 | 4/2010 | Imaki et al. |
| 2010/0199276 | A1 | 8/2010 | Umbehocker |
| 2010/0229178 | A1 | 9/2010 | Ito |
| 2010/0292980 | A1 | 11/2010 | Andrade et al. |
| 2010/0293532 | A1 | 11/2010 | Andrade et al. |
| 2010/0293535 | A1* | 11/2010 | Andrade et al. ............. 717/156 |
| 2011/0022812 | A1 | 1/2011 | van der Linden et al. |
| 2011/0191759 | A1* | 8/2011 | Andrade et al. ............. 717/151 |
| 2012/0123994 | A1 | 5/2012 | Lowry et al. |
| 2012/0179809 | A1 | 7/2012 | Barsness et al. |
| 2013/0080652 | A1 | 3/2013 | Cradick et al. |
| 2013/0080653 | A1 | 3/2013 | Santosuosso et al. |
| 2013/0081042 | A1 | 3/2013 | Branson et al. |
| 2013/0290969 | A1 | 10/2013 | Branson et al. |

OTHER PUBLICATIONS

U.S. Appl. No. 13/190,694 entitled Dynamic Reduction of Stream Backpressure, filed Jul. 26, 2011.
U.S. Appl. No. 13/190,717 entitled Using Predictive Determinism Within a Streaming Environment, filed Jul. 26, 2011.
U.S. Appl. No. 13/190,810 entitled Management System for Processing Streaming Data, filed Jul. 26, 2011.
U.S. Appl. No. 13/361,287 entitled Processing Element Management in a Streaming Data System, filed Jan. 30, 2012.
U.S. Appl. No. 13/456,600 entitled Operator Graph Changes in Response to Dynamic Connections in Stream Computing Applications, filed Apr. 26, 2012.
International Search Report and Written Opinion of the ISA dated May 14, 2013—International Application No. PCT/IB2013/050228.
Da Costa et al., "The Dynamic Trace Memoization Reuse Technique", Parallel Architectures and Compilation Techniques, Oct. 2000, pp. 92-99, Philadelphia, USA.
U.S. Appl. No. 13/682,008 entitled "Dynamic Reduction of Steam Backpressure", filed Nov. 20, 2012.
U.S. Appl. No. 13/681,919 entitled "Using Predictive Determinism Within a Streaming Environment", filed Nov. 20, 2012.
U.S. Appl. No. 13/681,820 entitled "Dynamic Runtime Choosing of Processing Communication Methods", filed Nov. 20, 2012.
U.S. Appl. No. 13/681,769 entitled "Management System for Processing Streaming Data", filed Nov. 20, 2012.
U.S. Appl. No. 13/709,405 entitled "Processing Element Management in a Streaming Data System", filed Dec. 10, 2012.
U.S. Appl. No. 13/675,872 entitled "Streams Optional Execution Paths Depending Upon Data Rates", filed Nov. 13, 2012.
U.S. Appl. No. 13/706,115 entitled "Streams Optional Execution Paths Depending Upon Data Rates", filed Dec. 5, 2012.
Lipasti et al., "Exceeding the dataflow limit via value prediction.", In Proceedings of the 29th annual ACM/IEEE international symposium on Microarchitecture (MICRO 29), IEEE Computer Society, Washington, DC, USA, 226-237.
International Search Report and WRitten Opinion of the ISA dated Dec. 20, 2012—International Application No. PCT/IB2012/053790.

* cited by examiner

OPERATOR GRAPH CHANGES IN RESPONSE TO DYNAMIC CONNECTIONS IN STREAM COMPUTING APPLICATIONS

CROSS-REFERENCE TO RELATED APPLICATIONS

This application is a continuation of co-pending U.S. patent application Ser. No. 13/456,600, filed Apr. 26, 2010. The aforementioned related patent application is herein incorporated by reference in its entirety.

BACKGROUND

1. Field of the Invention

Embodiments of the present invention generally relate to stream computing applications that process streaming data. Specifically, the invention relates to optimizing a stream computing application to mitigate effects on performance from dynamic connections.

2. Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the invention provide a method, system and computer program product for optimizing a stream computing application. The method, system, and computer program include executing a first job and a second job comprising a plurality of respective operators that process streaming data by operation of one or more computer processors and establishing an operator graph of the plurality of respective operators. The operator graph defines at least one execution path in which a first operator of the plurality of respective operators of the first job is configured to at least one of: receive data tuples from at least one upstream operator in the first job and transmit data tuples to at least one downstream operator in the first job. The method, system, and computer program include establishing a connection between the first job and the second job by transmitting a data stream from the first operator of the first job to a second operator of the second job and monitoring a performance indicator associated with the first operator of the first job. The performance indicator measures an effect that the connection between the first and second jobs has on a performance of the first job. Upon determining a value of the performance indicator satisfies a predefined threshold, the method, system, and computer program include optimizing the stream computing application to improve the value of the performance indicator.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
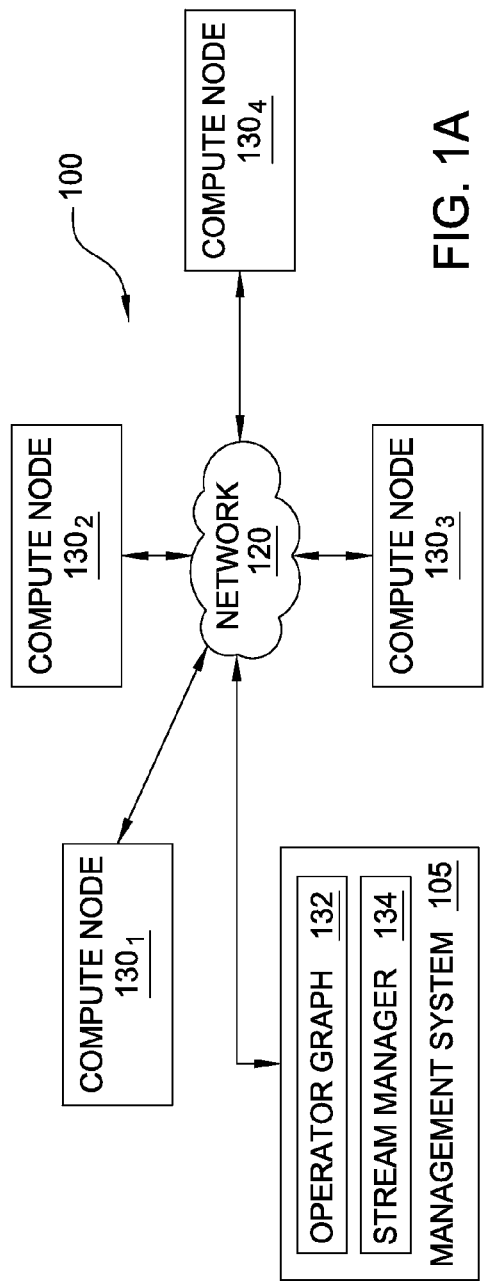
FIGS. 1A-1B illustrate a computing infrastructure configured to execute a stream computing application, according to embodiments described herein.

Stream-based computing and stream-based database computing are emerging as a developing technology for database systems. Users may create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating executables (i.e., processing elements), as well as replicating processing elements on multiple nodes and load balancing among them. Operators in a stream computing application can be fused together to form a processing element that is executable. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

A stream computing application may have several jobs (i.e., specific applications) executing in parallel. Each job may be associated with an individual data flow. These individual data flows may be thought of as separate operator graphs or portions of the same logical operator graph. In either case, a job or administrator may specify a particular stream of data (e.g., a connection between processing elements or operators in the operator graph) as exportable. A different job may then dynamically connect to the exportable data stream (i.e., import the data stream). This is referred to as a "dynamic connection" because both jobs are currently executing when they begin to share the data stream.

As more and more jobs dynamically connect to the data stream, the connections may have a negative impact on the performance of the exporting job. Accordingly, a variety of metrics and statistics (e.g., CPU utilization or tuple rate) may be monitored to determine if the dynamic connections are harming performance. If so, the stream computing system may be optimized to mitigate the effects of the dynamic connections. For example, particular operators may be unfused from a processing element and moved to a compute node that has available computing resources. Regardless of the optimization technique used, the stream computing system may wait until the system has spare cycles (i.e., is idle) before optimizing the stream application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Figure 1B:
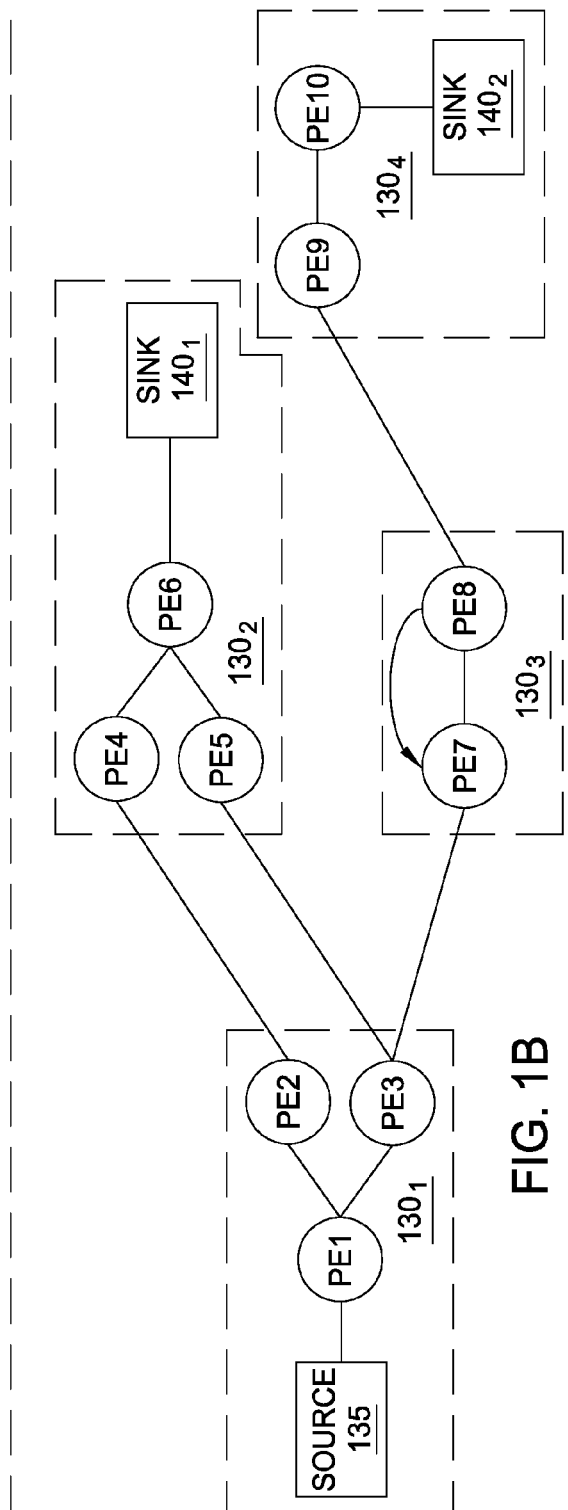

FIGS. 1A-1B illustrate a computing infrastructure configured to execute a stream computing application, according to one embodiment of the invention. As shown, the computing infrastructure 100 includes a management system 105 and a plurality of compute nodes $130_{1-4}$—i.e., hosts—which are communicatively coupled to each other using one or more communication devices 120. The communication devices 120 may be a server, network, or database and may use a particular communication protocol to transfer data between the compute nodes $130_{1-4}$. Although not shown, the compute nodes $130_{1-4}$ may have internal communication devices for transferring data between processing elements (PEs) located on the same compute node 130.

The management system 105 includes an operator graph 132 and a stream manager 134. As described in greater detail below, the operator graph 132 represents a stream application beginning from one or more source operators through to one or more sink operators. This flow from source to sink is also generally referred to herein as an execution path. Although FIG. 1B is abstracted to show connected PEs, the operator graph 132 may comprise of execution paths where data flows between operators within the same PE or different PEs. Typically, processing elements receive an N-tuple of data attributes from the stream as well as emit an N-tuple of data attributes into the stream (except for a sink operator where the stream terminates or a source operator where the stream begins).

Of course, the N-tuple received by a processing element need not be the same N-tuple sent downstream. Additionally, PEs may be configured to receive or emit tuples in other formats (e.g., the PEs or operators could exchange data marked up as XML documents). Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the deployment of the operator graph 132. The stream manager 134 may move PEs from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements) running on the compute nodes $130_{1-4}$. One example of a stream computing application is IBM®'s InfoSphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. A processing element is composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Because a processing element is a collection of fused operators, it is equally correct to describe the operator graph as execution paths between specific operators, which may include execution paths to different operators within the same processing element. FIG. 1B illustrates execution paths between processing elements for the sake of clarity.

In one embodiment, the stream manger 134 may be able to communicate with other operator graphs executing in a stream computing application. That is, the compute nodes 130 may host independent operator graphs that execute in parallel. The stream manager 134 may be able to communicate with a stream manager associated with those parallel operator graphs using, for example, a shared memory where messages and commands may be passed. Alternatively, stream manager 134 may be part of a hierarchical arrangement of stream managers that allow the different stream managers to communicate. The stream manager 134 may use the manager hierarchy or the shared memory to instruct a different stream manager to optimize an operator graph in the stream computing application that is sharing the same compute nodes 130 (i.e., hardware resources) as the operator graph shown in FIG. 1B.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a database processing application.

Figure 2:
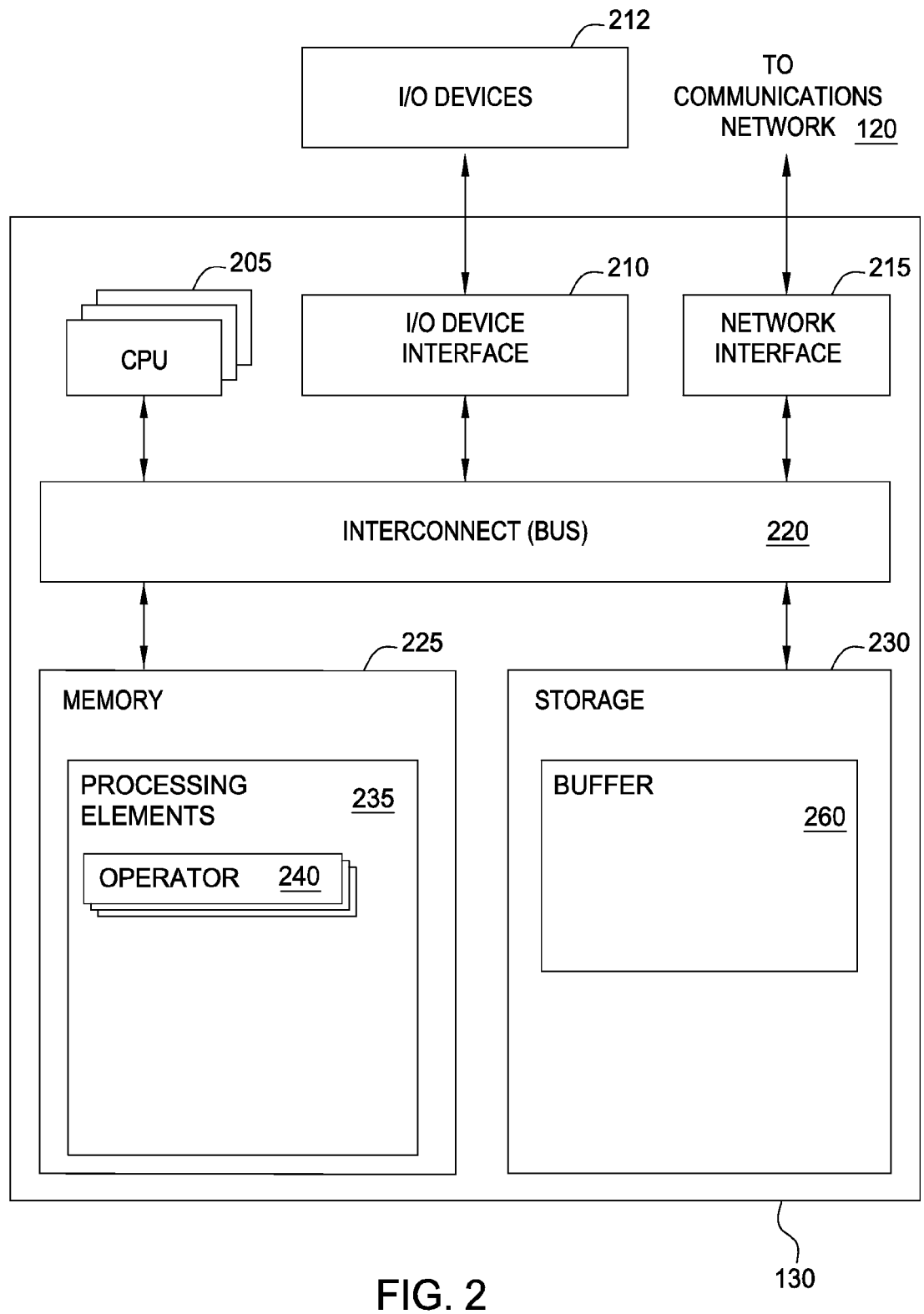
FIG. 2 is a more detailed view of the compute node of FIGS. 1A-1B, according to one embodiment described herein.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, storage 230 contains a buffer 260. Although shown as being in storage, the buffer 260 may located in the memory 225 of the compute node 130 or a combination of both. Moreover, storage 230 may include storage space that is external to the compute node 130.

Figure 3:
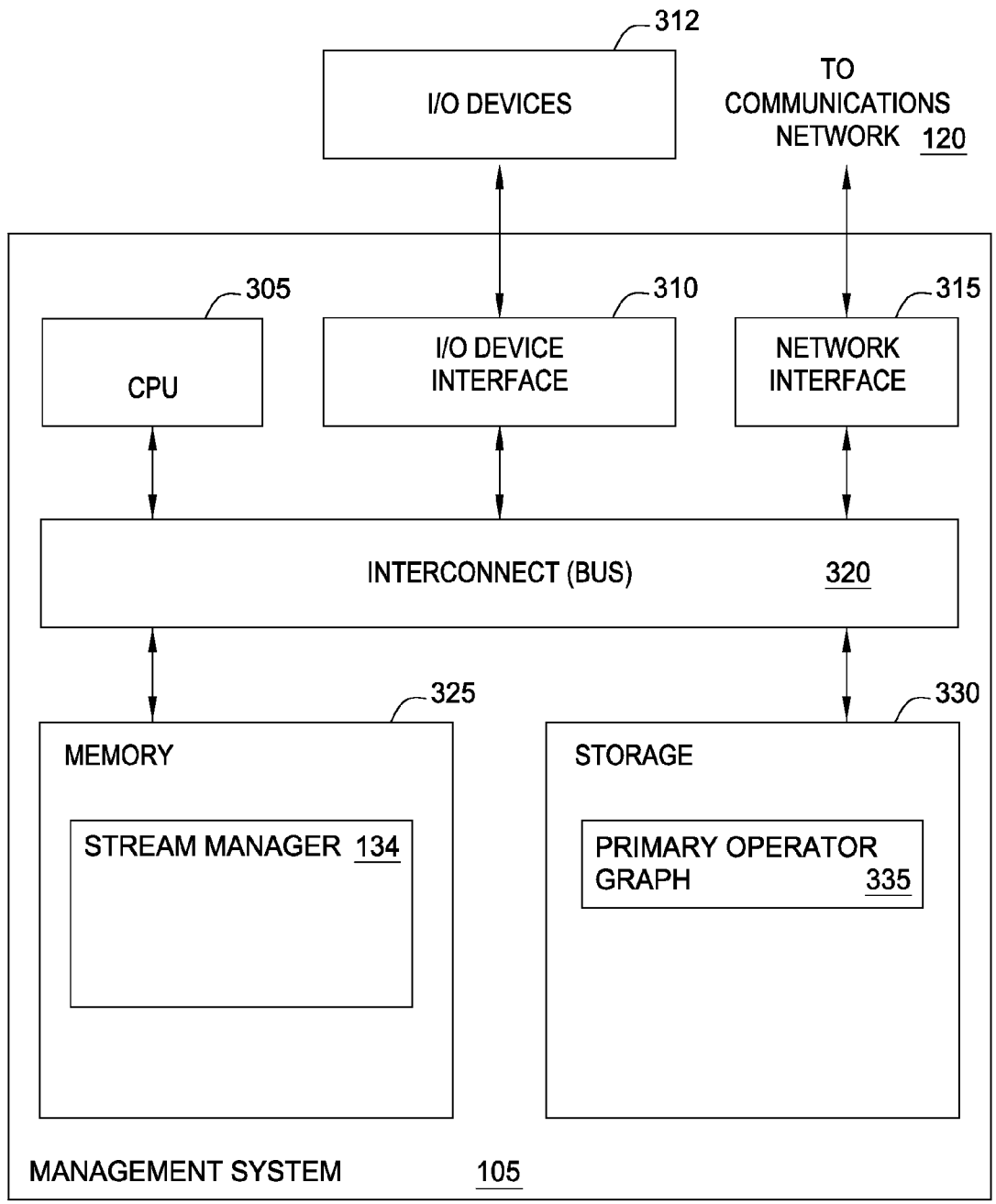
FIG. 3 is a more detailed view of the server management system of FIGS. 1A-1B, according to one embodiment described herein.

FIG. 3 is a more detailed view of the server management system 105 of FIG. 1, according to one embodiment of the invention. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing.

Figure 4A:
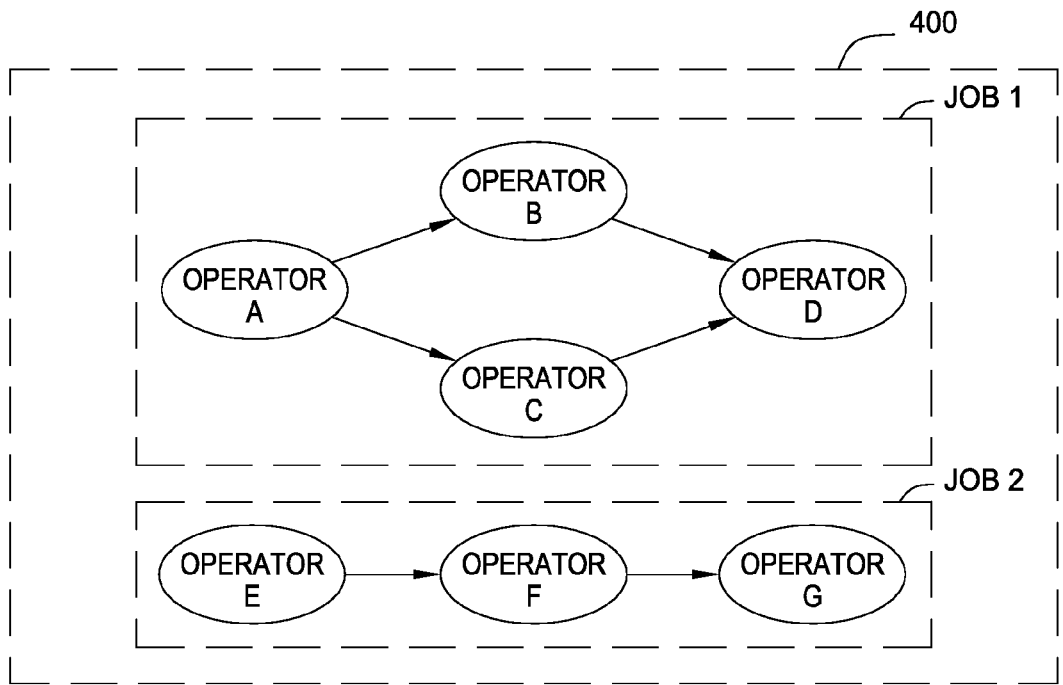
FIGS. 4A-4B illustrate dynamically connecting jobs in a stream computing application, according to embodiments described herein.
Figure 4B:
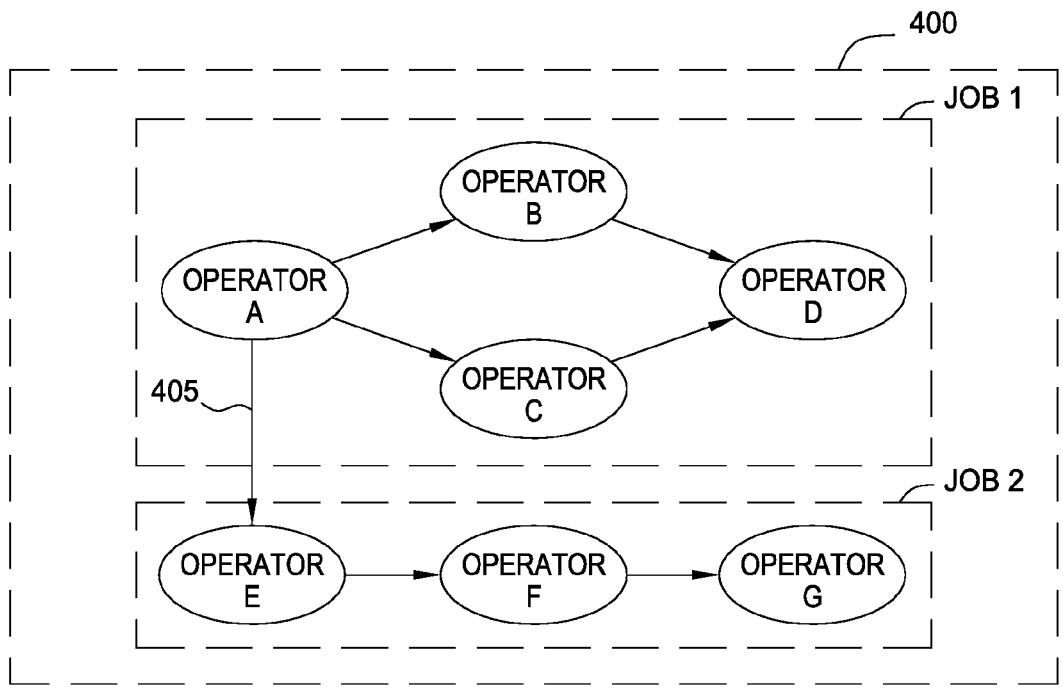

FIGS. 4A-4B illustrate dynamically connecting jobs in a stream computing application, according to embodiments described herein. As shown in FIG. 4A, an operator graph 400 may contain one or more jobs. Job 1 includes operators A-D while Job 2 includes operators E-G. Thus, in one embodiment, Job 1 and 2 are two separate data streams within the stream computing application or operator graph 300. Stated differently, the two data streams do not transmit data tuples to each other.

However, even though Job 1 and 2 may be separate streams, their respective operators may still be hosted on the same computer hardware that support the stream computing application. For example, Operator A of Job 1 may be executed on the same compute node as Operator E of Job 2. Thus, operators from different jobs may share the same network interface 215, memory 225, or CPU 205, of the compute node 130 as shown in FIG. 2.

In order to more efficiently use computational resources, jobs may be connected so that data streams may be shared. In one embodiment, the jobs are connected dynamically to share a data stream—i.e., the jobs are connected by the data stream while both jobs are currently executing as shown in the operator graph 300. For example, Operator A may receive a real time audio feed and perform speech to text translation to generate a text file. Operators B-D may perform different operations with the text file such as text analytics or store the text file to a database.

Job 2 may then begin to execute within the stream computing application. Operators E-G may perform a special textual analytic to determine, for example, the level of stress of a person based on her speech. For Job 2 to perform its analysis on the audio received by Operator A, a system administrator (or stream manager 134) may set the data stream exiting Operator A as exportable. Once this permission is given, Job 2 may then dynamically connect to Operator A so that it also receives the data stream being transmitted by Operator A—i.e., Job 2 imports the data stream of Operator A from Job 1.

Because Operator E can receive the already translated text from Operator A instead of Job 2 needing its own operator to translate the audio feed to text, efficiency may be increased. As more and more jobs that need the translated text begin to execute, more dynamic connections may be made.

FIG. 4B illustrates a dynamic connection 405 between Job 1 and 2. When establishing the dynamic connection 405, the stream manger 134 may determine which communication protocol should be used. Stream applications are able to use a variety of communication protocols to transfer data between operators and/or processing elements. These protocols may be classified into two types: intra-nodal and inter-nodal. Intra-nodal communication protocols may be used when a processing element transfers data to a processing element located on the same compute node. This type may be performed, for example, by using a shared data bus to directly transfer data from one processing element to another or by using shared memory within the compute node (e.g., RAM). Inter-nodal communication protocols may be used for processing elements that are executed on either the same compute node or different compute nodes. Inter-nodal communication protocols include protocols that use, for example, TCP/IP, shared file systems, relational databases, InfiniBand® (InfiniBand® is a trademark of the InfiniBand Trade Association) or remote direct memory access (RDMA). Generally, inter-nodal communication protocols use communication devices (e.g., a server or database) that are external to the compute node in contrast to shared memory or a bus that are located within a compute node.

The dynamic connection 405 may use either intra-nodal or inter-nodal communication techniques for transmitting the data stream from Operator A to Operator E. For example, if the Operator A and E are hosted by the same compute node, an intra-nodal communication technique may be preferred.

However, as more dynamic connections are made, the performance characteristics of Job 1 can change as Operator A is tasked with transmitting the data stream to the additional jobs. As more jobs are added, the dynamic connections may begin to decrease the performance of the stream computing application.

Figure 5:
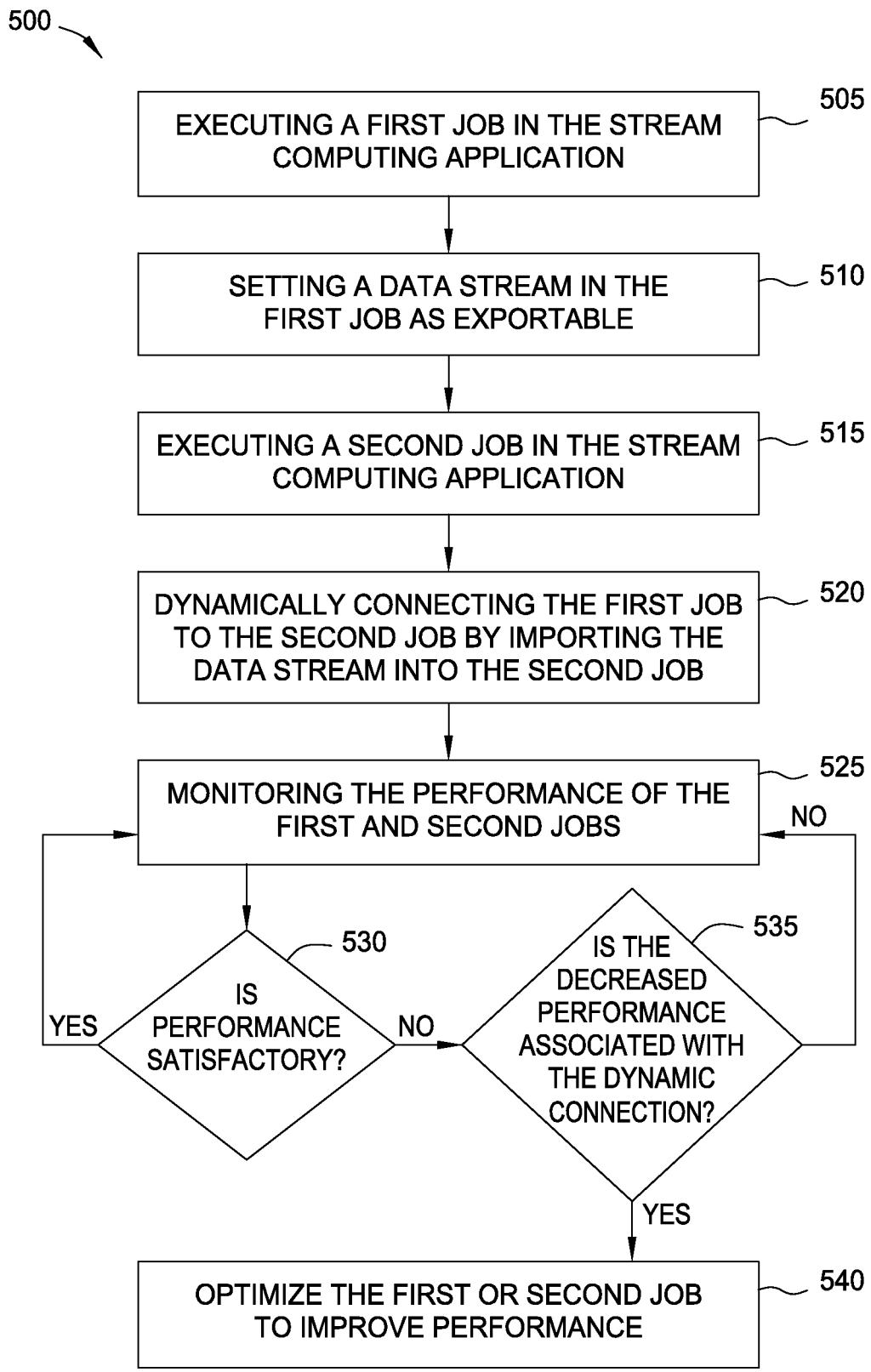
FIG. 5 is a method of optimizing an operator graph with dynamic connections, according to one embodiment described herein.

FIG. 5 is a method 500 of optimizing an operator graph with dynamic connections, according to one embodiment described herein. At step 505, a first job in a stream computing application begins to execute. The first job may comprise of a plurality of processing elements where each processing element comprises of one or more fused operators. Using intra- and inter-nodal communications, the operators transmit data tuples amongst themselves to generate one or more execution paths (i.e., data streams).

At step 510, a portion of one of the data stream that are marked as exportable become available for dynamic connections. This means a different job may be able to connect to the first job such that it receives a copy of the data flowing in the execution path. A job may be designated as exportable either before or after the jobs begin to execute. For example, the first job may be marked as exportable before it executes, or alternatively, the first job may be marked as exportable after it has begun to execute but before the second job executes. At step 515, a second job in the stream computing application may begin to execute. As shown in FIG. 4A, these jobs may have separate data streams but be considered logically as part of the same overall operator graph of the stream computing application. For example, the two jobs may both use the same execution platform established by the stream application but are different applications that may perform different functions. Stated differently, the first and second jobs may be thought of as sub-modules of an overall application. If the application is coded to perform two functions, then the developer may decide to organize the application as first and second jobs which perform one of the respective functions.

At step 520, the second job dynamically connects to the exportable portion of the data stream in the first job. For example, as shown in FIG. 4B, Operator E in Job 2 imports a copy of the same data tuples that are transmitted from Operator A to Operators B and C (i.e., the exportable portion of the data stream). In one embodiment, step 515 and 520 may repeat as more and more additional jobs begin to execute and dynamically connect to Operator A of Job 1 (or any other exportable operater).

At step 525, the stream manager 134 may monitor the performance of one or both of the jobs. Specifically, the stream manager 134 may monitor one or more performance indicators which may measure the performance of the operators or the computer hardware that hosts the operators. If the performance indicators are associated with the operators, the stream manager 134 may measure statistics such as the tuple rate flowing out of an operator. Specifically, the stream manager 134 may used historical data to determine a rate of change of the tuple rate. A decreasing tuple rate may indicate the performance of the operator is decreasing.

Another performance indicator associated with an operator may be the buffer utilization. For example, the stream manager 134 may monitor how much space is being used in the operator's input buffer. If the input buffer is almost full, this may indicate that the operator is unable to process tuples as fast as they are received. This may result in backpressure. Similarly, the performance indicator may monitor the backpressure experienced by operators that are upstream from the operator. For example, the stream manager 134 may monitor the utilization of output buffers. If these buffers are full—i.e., the destination operator's buffer is already full, and thus, cannot accept more data tuples—this may indicate that the performance of the stream is decreasing.

In one embodiment, the stream manager 134 may monitor a performance indicator directly associated with the operator (or operators) that are generating the data stream which is transmitted to different jobs, for example, the rate of change of the tuple throughput or buffer utilization of Operator A in FIG. 4B. Alternatively, the stream manager 134 may monitor performance indicators for some or all of the operators in only the first job, or some or all of the operators in only the second job, or some mixture of both.

The stream manager 134 may monitor performance indicators associated with the computer hardware that hosts the operators of the jobs. For example, instead of measuring statistics associated with operators, the stream manager 134 may monitor the performance metrics of the computer hardware the operators use to process the tuples in the data stream. Different types of metrics include CPU utilization, bus utilization, memory utilization, network traffic, and the like. If these hardware resources are being used at high levels (e.g., greater than 90%), it may indicate that the resources cannot keep up with the processing demands made by the operators.

For example, if Operator A uses TCP/IP to transmit its data stream to a plurality of dynamically connected jobs, the stream manager 134 may monitor the TCP/IP network interface on the compute node that hosts Operator A. If the buffers associated with the network interface are full, the network interface may be unable to transmit data tuples fast enough to all the different dynamically connected jobs. Similarly, the stream manager 134 may monitor the usage of the bus 220 shown in FIG. 2 which may be used for intra-nodal communication. If the bus 220 is congested—i.e., applications must wait to gain access to the buss 220—this may indicate that the computer resources hosting the operators are insufficient for meeting the demands of the operators.

In one embodiment, the stream manager 134 may monitor only the performance metrics of the computer resources that host the operator or operators that generate the data stream used in the dynamic connections—e.g., the compute node that hosts Operator A.

At step 530, the stream manager 134 may use the selected one or more performance indicators to determine whether the performance of the stream computing application is satisfactory. In one embodiment, the stream manager 134 may compare a value of one of the performance indicators to see if it falls below a predefined threshold. For example, the stream manager 134 may compare the rate at which tuples leave a selected operator or the CPU utilization percentage to see if they meet the threshold. Alternatively, the stream manager 134 may use historical data to determine a rate at which these values are changed. For example, if the CPU utilization increased from 50% to 65% over a certain time period, this rate of change may exceed a threshold set by an administrator, and thus, indicate that performance is deteriorating. Advantageously, monitoring the rate at which these performance indicators changes may help to predict performance issues before the throughput of the data streams is affected. That is, the stream computing application may currently be able to satisfy the demands of the jobs, but if the rate continues, the throughput may begin to decrease.

In one embodiment, the stream manager 134 may compare two or more performance indicators. This strategy may decrease the possibility of detecting a false positive where only one performance indicator meets a threshold, yet the stream application's throughput is unaffected. Evaluating at least two performance indicators reduces the chance of a false positive. Moreover, the stream manager 134 may evaluate at least one performance indicator associated with an operator (e.g., tuple rate or buffer utilization) and at least one performance indicator associated with the compute node that hosts the operator (e.g., CPU, bus, or memory utilization). This may further reduce the likelihood of false positives and increase the ability of the stream manager 134 to accurately measure the performance of the stream computing application.

By using one or more of the performance indicators, if the stream manager 134 determines that the performance of the stream computing application is not satisfactory, at step 535, the stream manager 134 may determine whether the deteriorating performance is correlated to, or at least partially caused by, the dynamic connections.

In one embodiment, the performance indicators may be influenced by other factors besides dynamic connections. For example, the stream application may have added other jobs which means the different executing jobs may have to share the same limited computing resources (even if they are not dynamically connected). Moreover, the data being injected into the operator graph to be processed by the jobs may have increased, or one or more of the compute nodes may have failed. Accordingly, the stream manager 134 may determine whether the deteriorating performance is because of the dynamic connections or because of the other factors listed above.

In one embodiment, the stream manger 134 may track the number of dynamic connections and the time they are made. For example, if the stream computing application added a dynamic connection and soon after (i.e., within a defined time period) a performance indicator rose above a threshold, the stream manager 134 may assume it was the new dynamic connection that caused the deteriorated performance. Alternatively, the stream manager 134 may assume the dynamic connection caused the decrease in performance if the number of dynamic connections exceeds a specified number. That is, the stream manager 134 may assume based solely on the number of dynamic connections that the dynamic connections are negatively affecting the performance of the stream computing application.

In one embodiment, the stream manager 134 may measure, for example, the CPU utilization on the node that hosts Operator A each time a new dynamic connection is made. If the utilization percentage rises by substantially the same value each time a connection is made, the stream manager 134 may assume that when the utilization rate rises by that value and exceeds the threshold, it was because of a new dynamic connection.

In one embodiment, the correlation may between the degrade in performance and the dynamic connections may be assumed if the stream manger 134 monitors performance indicators associated with the operator that is producing the shared data stream. That is, the stream manager 134 may directly monitor, for example, the tuple rate of Operator A or the CPU utilization of the compute node that hosts Operator A. By focusing on performance indicators related to the operator which is exporting the data stream, the stream manager 134 may assume it is the dynamic connections that are harming performance.

Further, the stream manager 134 may compare a performance indicator with the operator to a similar performance indicator on a different operator which is not exporting the data stream. For example, the stream manager 134 may monitor the CPU utilization of the CPU used by Operator A and the CPU used by Operator C. If they are similar, then the stream manager 134 may determine the dynamic connections are not causing the performance degradation. However, if the CPU utilization for the CPU assigned to Operator A is much higher than the CPU utilization for the CPU assigned to Operator C, the stream manager 134 may assume that the dynamic connections are affecting performance.

If the stream manager 134 correlates the measured decrease in performance to a dynamic connection, at step 540, the stream manager 134 may optimize the operator graph to mitigate the negative effects of the dynamic connections on performance.

Figure 6A:
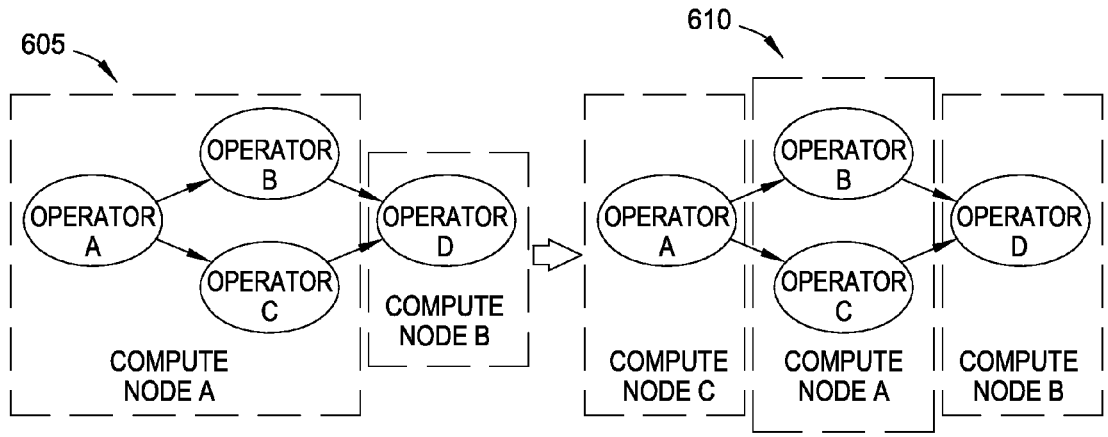
FIGS. 6A-6C illustrate different optimization strategies for an operator graph with dynamic connections, according to embodiments described herein.
Figure 6B:
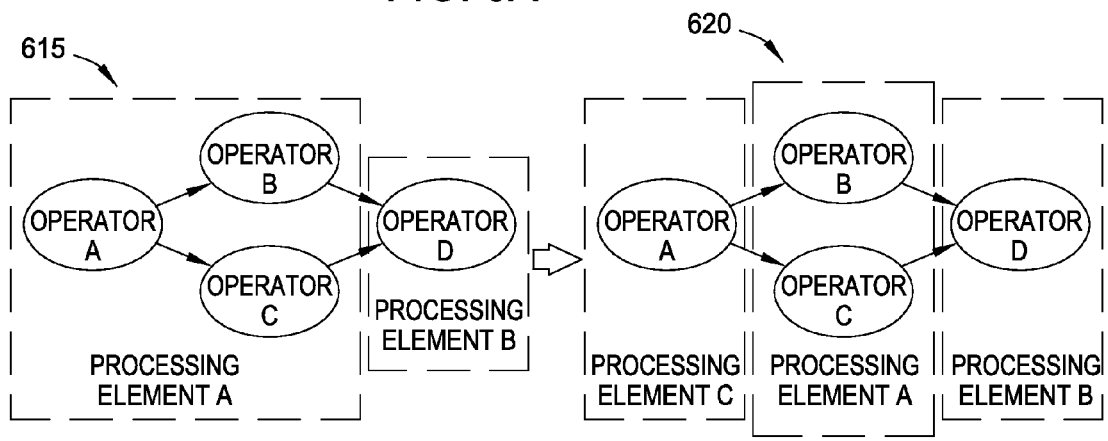
Figure 6C:
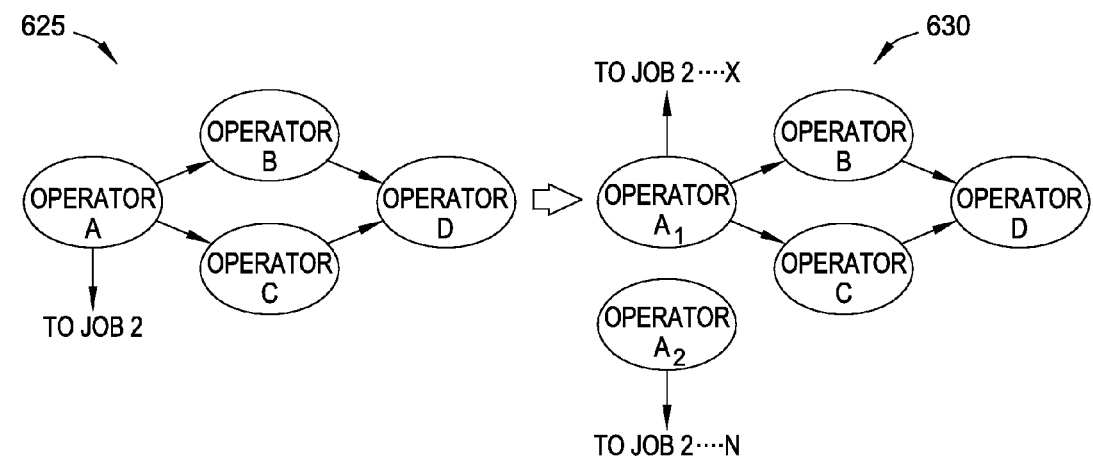

FIGS. 6A-6C illustrate different optimization strategies for an operator graph with dynamic connections, according to embodiments described herein. FIG. 6A illustrates transferring one or more operators to a compute node with available computing resources. Operating graph 605 shows that Operators A-C are found on compute node A while Operator D is found on Compute Node B. However, the stream manager 134 may determine, for example, that a performance metric associated with Compute Node A has fallen below a predefined threshold because of the dynamic connection 405 shown in FIG. 4B. Thus, the stream manager 134 may move Operator A to a different compute node that has available computing resources. For example, Compute Node C in operator graph 610 may have an unused CPU or use a faster inter-nodal communication technique to transfer the data stream to the dynamically connected jobs.

FIG. 6B illustrates unfusing or fusing an operator to mitigate the effects of dynamic connections. As mentioned above, operators in a stream computing application can be fused together to form a processing element that is a single executable. In one embodiment, in order to move Operator A to a different compute node as shown in FIG. 6A, Operator A may need to be unfused from its current processing element and then fused into a different processing element in the new compute node. That is, in operator graph 615, Operators A-C are fused to create Processing Element A. Operator A is then unfused from Processing Element A and fused into Processing Element B as shown in operator graph 620. Moreover, Processing Element B may be located on a different compute node from Processing Element A although this may not be necessary to increase performance.

In one embodiment, Operator A may be unfused from Processing Element A and fused into Processing Element C which contains a plurality of operators. For example, if Operator A receives data tuples from two upstream operators that are located on different compute nodes, those upstream operators may be fused with Operator A to form Processing Element C. This may enable the operators to use intra-nodal communication techniques (e.g., shared memory or the internal bus) to pass data rather than inter-nodal communication techniques.

FIG. 6C illustrates cloning the operator generating the exportable data stream to mitigate the effects of dynamic connections. In operator graph 625, Operator A transmits a copy of its data stream to Job 2. However, as more jobs dynamically connect to Operator A, its performance may deteriorate. Accordingly, operator graph 630 includes at least one clone of Operator A—i.e., Operator $A_2$. The cloned Operator $A_2$ may be exactly the same as the original operator (i.e., the same chunk of code) but it may receive from, or transmit data to, different operators. Stated differently, the cloned Operator $A_2$ generates a second exportable data stream. Accordingly, the cloned Operator $A_2$ may perform the same audio to text translation performed by the original Operator $A_1$ but transmits the results to different dynamically connected jobs.

The original Operator $A_1$ and the cloned Operator $A_2$ may divide up the number of dynamic connections. As shown, Operator $A_1$ transmits data streams to Jobs 2-X while Operator $A_2$ transmits data streams to Jobs X-N. Because Operator $A_1$ also transmits data to Operators B and C, Operator $A_1$ may transmit data streams to two less Jobs than Operator $A_2$. That is, when cloning, the stream manager 134 may balance the workload between the original operator and its one or more clones.

For all the optimization techniques discussed above, the same techniques may be applied to a group of operators. For example, rather than Operator A performing the translation, a first operator may retrieve the data from the audio feed, a second operator may convert the audio feed into a file with a particular format, and a third operator may translate the audio file into a text file. When applied to the optimization technique shown in FIGS. 6A-C, all three of the operators may be, for example, moved to a separate compute node, fused or unfused into different processing elements, or cloned to form a second exportable data stream.

Moreover, the stream manager 134 may use a combination of the optimization techniques shown in FIGS. 6A-C. That is, the three operators may be unfused from a first processing element and fused into a processing element in a different compute node. Or the clones of the three operators which generate a second data stream may be hosted on a different compute node than the original three operators.

Although FIGS. 6A-C illustrate optimization methods performed on the operator that transmits the data stream to other dynamically connected jobs, this disclosure is not limited to such. That is, the same optimization techniques may be performed on other operators in the operator graphs and still mitigate the effects of dynamic connections. For example, in FIG. 6A, Operators B and C may be moved off of Compute Node A thereby freeing computer resources for Operator A. In FIG. 6B, Operators B and C may be unfused from Processing Element A and fused into a separate processing element. Because processing elements are typically assigned to a single CPU, if other operators in the processing element are removed, then the remaining operator may receive a greater percentage of the CPU's processing time. Thus, the operator (or operators) that generate the exportable stream do not have to be moved to a different compute node or processing element to mitigate the negative effects caused by the dynamic connections.

In one embodiment, a different operator graph may be optimized to increase the performance of the operator in the first job that hosts the dynamic connections. For example, upon determining to optimize the stream computing application, the stream manager 134 may instruct a different operator graph to be optimized which may increase the performance of the operator with the dynamic connections. That is, some or all of the optimization methods illustrated in FIGS. 6A-C may be applied to the operators of a second, different operator graph. For example, if the second operator graph has operators hosted by the same compute node that hosts the operator of the first operator graph with the dynamic connections, the operators of the second operator graph may be moved to a different compute node as shown in FIG. 6A. In this manner, optimizing a different operator graph may increase the performance of the operator with the dynamic connections. This optimization may be accomplished by the stream manager 134 sending an optimization command to the stream manager associated with the second operator graph.

In one embodiment, the method 500 in FIG. 5 may be altered such that before step 540 is performed, the stream manager 134 waits until the stream computing application is idle. Because the optimization techniques shown in FIGS. 6A-C may require pausing the stream application, the stream manager 134 may not perform these techniques until the data stream is not flowing—i.e., the job is idle. For example, the stream manager 134 may wait until the audio feed is not currently providing data. The stream manager 134 may then uses these extra clock cycles to optimize the operator graph without reducing the throughput of the data streams. Nonetheless, the stream manager 134 may optimize as the need arises rather than waiting for a pause in the data stream.

CONCLUSION

A stream computing application may permit one job to connect to a data stream of a different job. As more and more jobs dynamically connect to the data stream, the connections may have a negative impact on the performance of the job that generates the data stream. Accordingly, metrics and statistics (e.g., CPU utilization or tuple rate) may be monitored to determine if the dynamic connections are harming performance. If so, the stream computing system may be optimized to mitigate the effects of the dynamic connections. For example, particular operators may be unfused from a processing element and moved to a compute node that has available computing resources. Additionally, the stream computing application may clone the data stream in order to distribute the workload of transmitting the data stream to the connected jobs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for optimizing a stream computing application, comprising:
   executing a first job and a second job, each comprising a plurality of respective operators that process streaming data by operation of one or more computer processors, wherein the plurality of respective operators in the first and second jobs are, respectively, interconnected such that data tuples flow between the plurality of respective operators to perform the first and second jobs;
   establishing an operator graph comprising the plurality of respective operators of both the first and second jobs, the operator graph defining at least one respective execution path through the plurality of respective operators for the first job and for the second job;
   while the first and second jobs are executing, establishing a connection between the first job and the second job by transmitting a data stream from a first operator of the first job to a second operator of the second job, wherein the first and second jobs are in the operator graph both before and after the connection is established;
   before establishing the connection between the first job to the second job, setting the data stream as exportable, wherein the plurality of respective operators associated with the second job do not receive data from, or send data to, the plurality of respective operators associated with the first job prior to setting the data stream as exportable;
   monitoring a performance indicator associated with the first operator of the first job, the performance indicator measuring an effect that the connection between the first and second jobs has on a performance of the first job; and
   upon determining a value of the performance indicator satisfies a predefined threshold, optimizing the stream computing application to improve the value of the performance indicator.

2. The method of claim 1, wherein optimizing the stream computing application comprises optimizing the first job, further comprising, after determining the value of the performance indicator satisfies a predefined threshold, delaying optimizing the first job until the data stream of the first job is idle.

3. The method of claim 1, wherein monitoring the performance indicator further comprises:
   recording at least one of: a time when the first job connects to the second job and a number of jobs connected to the data stream of the first job.

4. The method of claim 1, wherein optimizing the stream computing application comprises one of: optimizing the operator graph, optimizing a different operator graph in the stream computing application that does not include the first and second jobs, and optimizing the first job.

5. The method of claim 1, wherein optimizing comprises at least one of: moving at least one of the plurality of respective operators to a compute node with available resources, fusing or unfusing at least one of the plurality of respective operators, and cloning the first operator of the first job that generates the data stream.

6. The method of claim 1, wherein the performance indicator comprises one of: CPU utilization on a compute node hosting one of the plurality of respective operators, memory utilization on a compute node hosting one of the plurality of respective operators, a tuple rate being transmitted from one of the plurality of respective operators, and a buffer utilization used by one of the plurality of respective operators.

7. A method for optimizing a stream computing application, comprising:
   executing a first job and a second job, each comprising a plurality of respective operators that process streaming data by operation of one or more computer processors, wherein the plurality of respective operators in the first and second jobs are, respectively, interconnected such that data tuples flow between the plurality of respective operators to perform the first and second jobs;
   establishing an operator graph comprising the plurality of respective operators of both the first and second jobs, the operator graph defining at least one respective execution path through the plurality of respective operators for the first job and for the second job;
   while the first and second jobs are executing, establishing a connection between the first job and the second job by transmitting a data stream from a first operator of the first job to a second operator of the second job, wherein the first and second jobs are in the operator graph both before and after the connection is established;
   monitoring a performance indicator associated with the first operator of the first job by recording at least one of a time when the first job connects to the second job and a number of jobs connected to the data stream of the first job, wherein the performance indicator measures an effect that the connection between the first and second jobs has on a performance of the first job; and
   upon determining a value of the performance indicator satisfies a predefined threshold, optimizing the stream computing application to improve the value of the performance indicator.

8. A method for optimizing a stream computing application, comprising:
   executing a first job and a second job, each comprising a plurality of respective operators that process streaming data by operation of one or more computer processors, wherein the plurality of respective operators in the first and second jobs are, respectively, interconnected such that data tuples flow between the plurality of respective operators to perform the first and second jobs;
   establishing an operator graph comprising the plurality of respective operators of both the first and second jobs, the operator graph defining at least one respective execution path through the plurality of respective operators for the first job and for the second job;
   while the first and second jobs are executing, establishing a connection between the first job and the second job by transmitting a data stream from a first operator of the first job to a second operator of the second job, wherein the first and second jobs are in the operator graph both before and after the connection is established;
   monitoring a performance indicator associated with the first operator of the first job, the performance indicator measuring an effect that the connection between the first and second jobs has on a performance of the first job; and
   upon determining a value of the performance indicator satisfies a predefined threshold, optimizing the stream computing application to improve the value of the performance indicator, wherein optimizing the stream computing application comprises at least one of: moving at least one of the plurality of respective operators to a compute node with available resources, fusing or unfusing at least one of the plurality of respective operators, and cloning the first operator of the first job that generates the data stream.

9. The method of claim 8, wherein monitoring the performance indicator further comprises:

recording at least one of: a time when the first job connects to the second job and a number of jobs connected to the data stream of the first job.

\* \* \* \* \*